US012173557B2

(12) United States Patent
Albertini

(10) Patent No.: US 12,173,557 B2
(45) Date of Patent: Dec. 24, 2024

(54) CURTAIN-BLIND

(71) Applicant: Global International Trading Limited, Ipswich (GB)

(72) Inventor: John Albertini, Ipswich (GB)

(73) Assignee: GLOBAL INTERNATIONAL TRADING LIMITED, Ipswich (GB)

( * ) Notice: Subject to any disclaimer, the term of this patent is extended or adjusted under 35 U.S.C. 154(b) by 508 days.

(21) Appl. No.: 17/505,767

(22) Filed: Oct. 20, 2021

(65) Prior Publication Data

US 2023/0003082 A1 Jan. 5, 2023

(30) Foreign Application Priority Data

Jun. 30, 2021 (GB) ...................................... 2109407

(51) Int. Cl.
*E06B 9/36* (2006.01)

(52) U.S. Cl.
CPC .................................... *E06B 9/367* (2013.01)

(58) Field of Classification Search
CPC . E06B 9/36; E06B 9/362; E06B 9/367; E06B 2009/2405; A47H 13/01; A47H 13/14
See application file for complete search history.

(56) References Cited

U.S. PATENT DOCUMENTS 4,291,738 A * 9/1981 Grenga ................... E06B 9/367 160/176.1 R
5,458,939 A * 10/1995 Kitchen .................. B29C 73/04 428/317.1
5,520,237 A * 5/1996 Finkelstein ............... E06B 3/80 160/184
5,749,404 A * 5/1998 Colson .................... E06B 9/367 160/84.04
6,050,322 A * 4/2000 Finkelstein ............ A47H 13/00 160/184
6,688,373 B2 * 2/2004 Corey ........................ E06B 9/36 160/84.05

(Continued)

FOREIGN PATENT DOCUMENTS

EP 1111183 A2 6/2001
EP 1146198 A2 10/2001

(Continued)

*Primary Examiner* — Johnnie A. Shablack
(74) *Attorney, Agent, or Firm* — Bond, Schoeneck & King, PLLC

(57) ABSTRACT

A curtain-blind system has hangers which hang multiple sections thereof. Each section has a first surface, a second surface, a first connector clamping the first surface, and a second connector clamping the second surface. The first connector is releasably hung on a first hanger and the second connector is releasably hung on a second hanger. The sections are arranged side-by-side on respective hangers with the first connector of one section being independently releasable from an adjacent section whilst remaining clamped to the first surface. A hanger has a head portion received in a head-rail and a hanger portion depending below the head portion. The hanger portion is configured to releasably hold independent connectors of first and second sections such that the sections are hung adjacently on the hanger portion in a side-by-side arrangement.

16 Claims, 5 Drawing Sheets

(56) References Cited

U.S. PATENT DOCUMENTS

| | | | | |
|---|---|---|---|---|
| 7,556,081 | B2 * | 7/2009 | Cech | E06B 9/264 160/177 V |
| 8,584,730 | B1 * | 11/2013 | Aderinto | E06B 9/365 160/168.1 P |
| 11,187,031 | B2 * | 11/2021 | Huang | E06B 9/36 |
| 11,346,152 | B2 * | 5/2022 | Wong | A47H 23/10 |
| 2006/0249261 | A1 * | 11/2006 | Elembaby | E06B 9/36 160/89 |
| 2007/0267153 | A1 * | 11/2007 | Hardy | E06B 9/367 160/168.1 V |
| 2008/0178423 | A1 * | 7/2008 | Patel | A47H 13/14 16/87.2 |
| 2008/0236766 | A1 * | 10/2008 | Vandervoort | B29C 66/73116 160/172 V |
| 2017/0354285 | A1 * | 12/2017 | Kim | E06B 9/364 |
| 2018/0298684 | A1 * | 10/2018 | Siebenaller | E06B 9/386 |
| 2019/0376338 | A1 * | 12/2019 | Huang | E06B 9/388 |
| 2020/0308733 | A1 * | 10/2020 | Byun | E06B 9/362 |
| 2021/0404251 | A1 * | 12/2021 | Nien | E06B 9/362 |
| 2022/0049544 | A1 * | 2/2022 | Schulman | E06B 9/386 |
| 2023/0003082 | A1 * | 1/2023 | Albertini | E06B 9/367 |
| 2023/0046453 | A1 * | 2/2023 | Williams | A47H 13/01 |
| 2023/0132417 | A1 * | 5/2023 | Huang | E06B 9/262 160/166.1 |

FOREIGN PATENT DOCUMENTS

| | | | |
|---|---|---|---|
| GB | 2549637 | A | 10/2017 |
| WO | 2020/150755 | A1 | 7/2020 |

* cited by examiner

CURTAIN-BLIND

The present disclosure comprises a curtain-blind system, more specifically curtain-blind systems that are adjustable such as to control the amount of permitted light.

INTRODUCTION

Blinds are an alternative window treatment solution that may be preferable to curtains for a number of reasons, for example allowing the user to adjust the amount of light into a room. Panel blinds comprise a plurality of elongated vertical strips, generally comprised of a fabric. The strips are each rotatable about an axis such as to define a light and dark condition. A drawback of panel blinds is that they may not sufficiently block light in the dark condition, e.g. when compared to curtains, as light tends to permeate through the fabric as well as between the gaps of adjacently hung strips.

Venetian blinds are another variant that comprise a plurality of horizontally hung slats generally made from wood, plastics or metals. The slats are therefore not prone to light permeating through the surfaces as with fabric-made panel blinds however, they are still susceptible to light passing through the gaps of adjacent slats. Another drawback of ready-made Venetian blinds is that they will not offer the perfect fit within a window frame and thus tend to suffer from light haloing around the edges. Made-to-measure blinds can mitigate the issue but are expensive. Furthermore, replacing individual slats of Venetian blinds for cleaning or repairs is cumbersome and may require specialist assistance.

Blinds also offer minimal privacy when in the light condition, e.g. allowing someone external to see into the interior.

GB2549637 discloses a curtain-blind system in which blackout strips are spaced by translucent strips. The blackout curtain strips are held on hangers to form a continuous, curtain-like window covering. The hangers allow turning of the blackout strips to a dark condition and to a light condition in which light can pass through the intervening translucent strips.

However the system disclosed in GB2549637 is time-consuming to hang, e.g. requiring measuring of the widow and assembly to match the widow width in a manner similar to curtains. Furthermore, if any of the strips are damaged or sullied, the entire curtain-blind must be removed for repair or replacement, again like a curtain.

It is the aim of the present invention to provide a curtain-blind system that overcomes or mitigates one or more of the problems addressed above.

SUMMARY OF INVENTION

According to a first aspect of the invention, there is a curtain-blind system comprising,

- a plurality of hangers,
- a plurality of curtain-blind sections, each section comprising,
  - a first surface,
  - a second surface,
  - a first connector clamping the first surface,
  - a second connector clamping the second surface,
- wherein the first connector is releasably hung on a first hanger, and
- wherein the second connector is releasably hung on a second hanger, and wherein the curtain-blind sections are arranged side-by-side on the plurality of hangers in use to define the curtain-blind system with the first connector of one curtain-blind section being independently releasable from an adjacent curtain-blind section whilst remaining clamped to the first surface.

Optionally, the second connector of one curtain-blind section may also be independently releasable from an adjacent curtain blind section whilst remaining clamped to the second surface.

Optionally, each of the plurality of curtain-blind sections may be releasable from its adjacent curtain-blind sections.

Advantageously, the curtain blind can be simply parted by a user between adjacent sections even when hung in use. Furthermore, individual sections can be individually hung independently of adjacent sections. This means that an entire curtain blind can be assembled and hung one section at a time. Individual sections can also be removed and replaced with ease, if required, without having to remove the entire curtain blind.

Optionally, one connector of each adjacent curtain-blind section may be releasably attached to a common hanger, e.g. on the same or opposing sides of a common hanger.

The first connector may clamp both sides of the first surface. The second connector may clamp both sides of the second surface.

The connectors act as interstitial members and are each mounted to their respective surfaces prior to being hung on a hanger. This prevents the user from having to clamp the entire curtain-blind at the same time prior to mounting the entire curtain blind to the hanger. The ability to hang the curtain-blind section by section can simplify installation.

The first surface of one section may be hung parallel with, next to and/or immediately adjacent the second surface of an adjacent section. Any spacing between surfaces when hung may be minimal, e.g. less than 3 cm, 2 cm, 1 cm or 0.5 cm.

Two adjacent curtain-blind sections may be hung on a common hanger such that one of the curtain-blind sections can be released independently from the adjacent curtain blind section whilst leaving the hanger in place. This allows for individual curtain-blind sections to be removed (i.e. for cleaning or replacing) even when they are located interstitially between two remaining curtain-blind sections.

Optionally, the plurality of curtain-blind sections may comprise a third surface and may be located between the first and second surfaces.

Optionally, the third surface may be comprised of a light-permeable material, relative to the first and second surfaces.

Optionally, the curtain-blind system may be moveable between a light and dark condition. The first and/or second surfaces may be rotatable (e.g. in unison) between the light and dark conditions. The first and second surfaces may be spaced in the light condition and/or may overlap in the second condition.

Optionally, light may be able to transverse through the curtain-blind system via the third surface.

Optionally, light is substantially unobstructed by the first and second surfaces from traversing through the third surface in the light condition. The first and/or second surfaces may be substantially perpendicular to the plane of a window or opening that is covered by the curtain-blind in the light condition.

Optionally, light is substantially obstructed by the first and second surfaces from traversing through the third surface in the dark condition. The first and/or second surfaces may be substantially parallel with, or oriented at an acute angle to, the plane of a window or opening that is covered by the curtain-blind in the dark condition.

Optionally, in the dark condition, at least a portion of the first or second surface of the curtain-blind section is overlapping with at least a portion of the first or second surface of an adjacent curtain-blind section such as to obstruct light from traversing through the curtain-blind system.

The third surface may be located in between the first and second surfaces and may be translucent when compared to the first and second surfaces. The third surface may join the first and second surfaces, e.g. being continuous with the first and second surfaces.

In the light condition, the first and second surfaces may be arranged to allow the light to transverse through the curtain-blind system. They may be angled to minimize the amount of light that lands on the major surface of the first and second surfaces (e.g. such that the first and second surfaces are angled such that the major faces are substantially/mostly parallel to the light).

Optionally, the curtain-blind system comprises a head-rail for mounting the plurality of hangers.

Optionally, the plurality of hangers is slidable along a longitudinal length of the head-rail.

Optionally, each of the hangers comprise a central axis about which they are rotatable, wherein the axis may be orthogonal to the longitudinal length of the head-rail.

Optionally, the rotation of the hangers moves the curtain-blind system between the light and dark conditions.

Optionally, the curtain-blind system may comprise an actuator.

Optionally, the actuator may drive the rotation of the hangers about their respective axes, such as to move the curtain-blind system between the light and dark condition.

Optionally, the actuator may be able to move the hangers within the head-rail, such to draw the curtain-blind system.

Optionally, the actuator comprises a cord, chain or wand (e.g. a manual actuator). The actuator may comprise a motor driven system.

The curtain-blind sections may be arranged adjacent to one another such that the first connector of a given curtain-blind section may be hung on a common hanger to the second connector of an adjacent curtain-blind section.

Optionally, the first connector may be comprised of a first and second plate.

Optionally, the first surface of the curtain-blind section is clamped between the first and second plate of the first connector.

Optionally, the second surface of the curtain-blind section is clamped between the first and second plate of the second connector.

Optionally, the first and second plates of the first and/or second connectors comprise at least one pair of complementary engagement members.

Optionally, the first plate comprises at least one protrusion.

Optionally, the second plate comprises at least one aperture for receiving the protrusion.

Other forms of engagement members are envisioned, for example bayonet engagement, screw, magnetic, bolt, clip etc. Alternatively, the first and second plates are hingeably attached.

Optionally, the first connector, e.g. the first and/or second plate thereof, comprises an attachment configured to allow the connector to be releasably attached to the hanger.

Optionally, the second connector, e.g. the first and/or second plate thereof, comprises an attachment configured to allow the connector to be releasably attached to the hanger.

Optionally, the first and second connectors are identical.

Optionally, the attachment comprises a handle/eye portion allowing the connector to be hung on a hanger.

Other forms of attachment means are envisaged, for example bayonet engagement, screw, magnetic, bolt, clip, handle, hook etc.

Optionally, the hangers may comprise a first attachment for receiving a connector.

Optionally, the hanger may comprise a second attachment for receiving a connector.

Optionally, the attachment of the hangers are hooks.

Optionally, the hangers are substantially 'J' shaped.

Optionally, the hangers are substantially 'T' or anchor-shaped.

Optionally, the first attachment is suitable for receiving the at least one connector, e.g. the attachment thereof.

Optionally, the first attachment is suitable for receiving two connectors. A single hook may receive one or two connectors, e.g. associated with one or two respective sections of the curtain-blind.

Optionally, the second attachment is suitable for receiving at least one connector, e.g. the attachment thereof.

The connectors may connect to the hangers through the complementary attachment. Where the hanger comprises a first attachment, the first connector of a given curtain-blind section and second connector of an adjacent curtain-blind section may be hung on the first attachment. The hanger may be substantially J-shaped such that the first attachment is a single hook and is suitable for receiving the attachment of the connectors (for example handles). Alternatively, the hanger may comprise a second attachment such that the hanger substantially forms an anchor or upside down T-shape such as to define two hooks. Each hook is then suitable for receiving a (single) connector portion.

According to a second aspect of the invention there is a hanger comprising, a first attachment suitable for releasably attaching to a connector portion of the curtain-blind section.

According to a third aspect of the invention, there is a curtain-blind hanger comprising;

a first connecting portion, a second connecting portion, wherein the first and second connecting portions are configured to releasably hold independent connectors of first and second curtain-blind sections such that the sections are hung adjacently on the hanger in a side-by-side arrangement.

According to a fourth aspect of the invention there is a method of hanging a curtain-blind system comprising, connecting a connector portion of a first curtain-blind section to a first hanger, connecting a connector portion of a second curtain-blind section to the first hanger, such that the first and second curtain-blinds share a common hanger.

Optionally, the connecting portion of successive curtain-blind portions can be hung next to a previously hung adjacent curtain-blind section, such that they are hung on a common hanger.

Optionally, each curtain-blind section can be hung and removed independently of the adjacent curtain-blind sections.

Optionally, the curtain blind system is actuatable between a light and dark condition.

Any of the optional or essential features defined in relation to any one aspect of the invention above may be applied to any further aspect, wherever practicable. Those optional feature combinations have not been explicitly repeated only for conciseness.

BRIEF DESCRIPTION OF THE FIGURES

Workable embodiments of the invention are described in further detail below, by way of example only, with reference to the accompanying drawings, of which.

DETAILED DESCRIPTION OF EXAMPLES OF THE INVENTION

Figure 1:
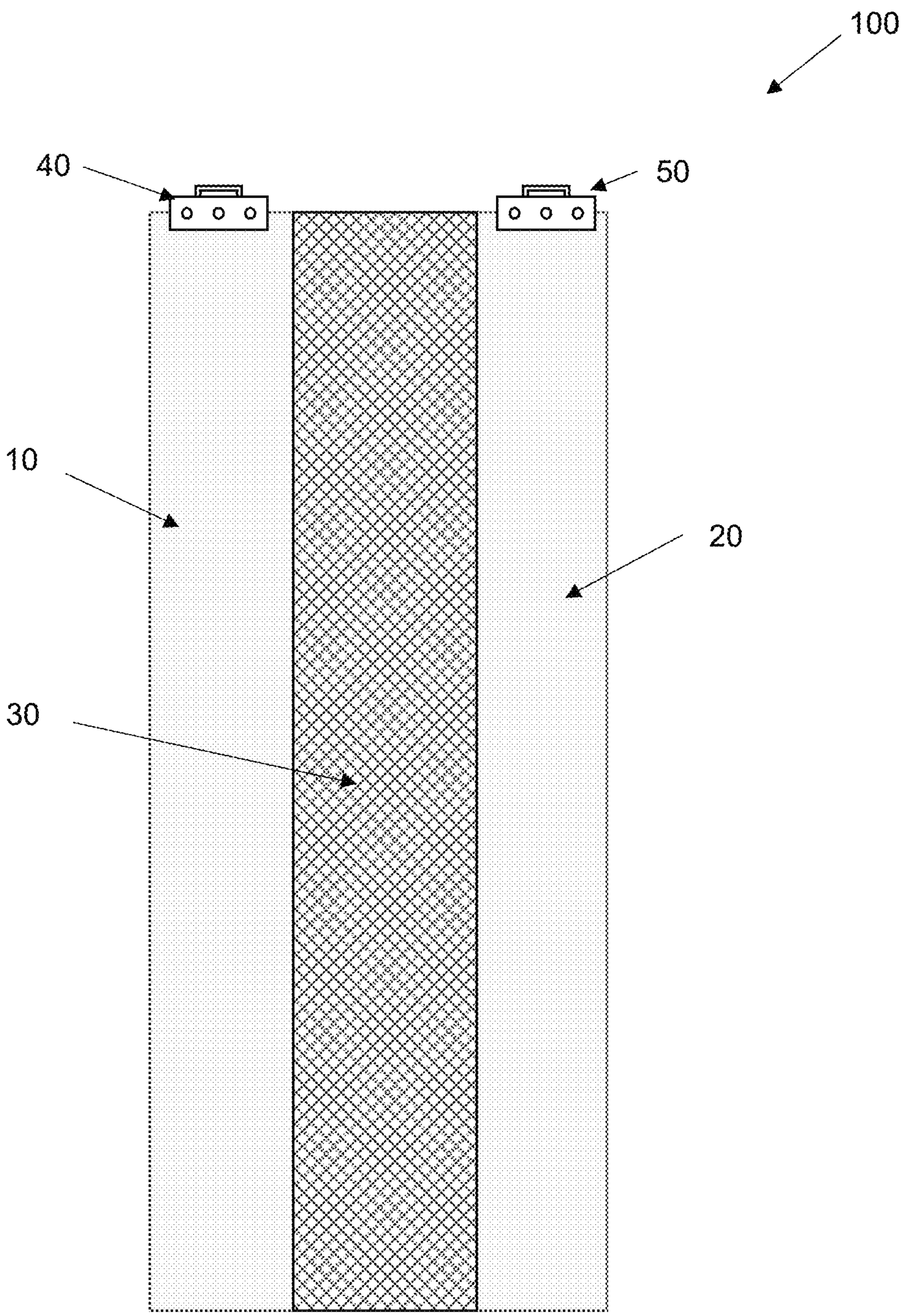
FIG. 1 shows a curtain-blind section.

FIG. 1 shows a curtain-blind section 100 to be used in a curtain-blind system. The curtain-blind comprises first 10, second 20 and third 30 surfaces. The first 10, second 20 and third 30 surface may take the form of elongate strips of material attached together in side-by-side arrangement along their long edges.

The first and second 20 surfaces may comprise an opaque material, such as a light-impervious or blackout material. A plurality of material layers may be used.

The third surface 30 is located between the first and second surfaces and is more light permeable (relative to the other surfaces). The material of the third surface may differ from the first and second surfaces and may be translucent.

The third surface 30 may comprise webbing or a mesh material and is joined or integrally manufactured with the first two surfaces by methods that will be known to the skilled person.

The first surface is clamped by a first connector 40 along a top edge. Similarly, the second surface is clamped by a second connector 50.

Figure 2:
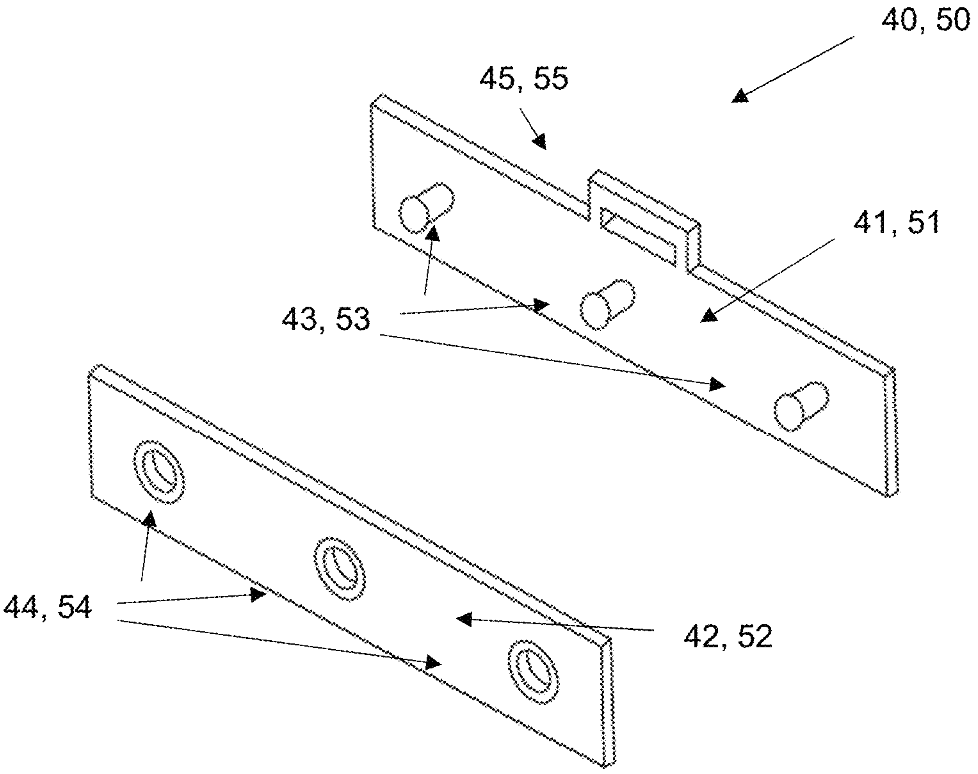
FIG. 2 shows a connector portion of a curtain-blind section.

A connector is shown in greater detail in FIG. 2. It should be appreciated that the first and second connectors are identical in this example, although they could be different if required.

The first plate 41, 51 of the connector comprises a plurality of engagement members (three in this example) in the form of protrusions 43, 53 that locate into complementary apertures 44, 54 in the second plate 42, 52 such that they are retained in position once inserted. The first plate further comprises a handle 45, 55 attachment means that protrudes from the top edge. The handle may be shaped to define an eye formation, or other similar formation, by which the connector can be hung in use.

The curtain-blind section is arranged by locating the first and second surfaces in between their respective connectors, and clamping the plates together. The protruding members pierce through the material of their respective surfaces, and engage with the apertures on the second plate.

Figure 3:
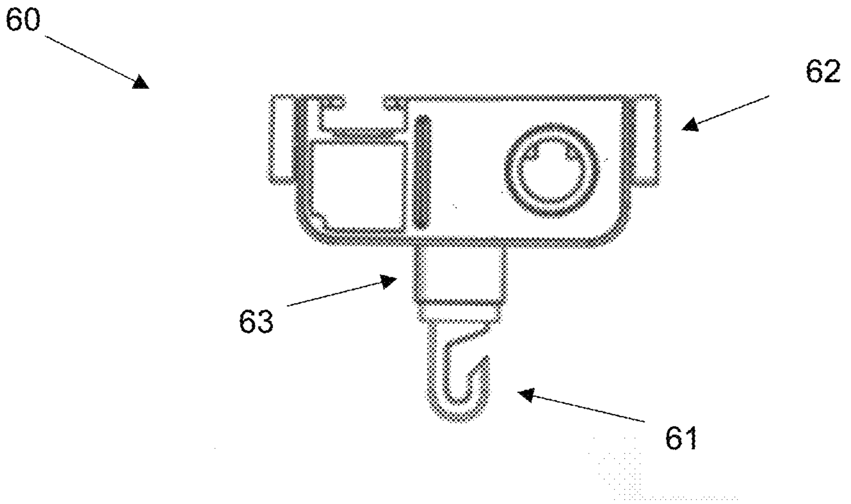
FIG. 3 shows a first embodiment of a hanger.

An example view of a hanger 60 is shown in FIG. 3. The hanger is substantially J-shaped such that it has a hook 61 which is suitable for receiving the handle 45, 55 of the first 40 and/or second 50 connectors.

The structure supporting the hook 61 (e.g. at the end opposing the hook) comprises a head structure 62 and a neck portion 63 interposed between the head structure 62 and hook 61. that the head structure 62 is receivable in a head rail (not shown) and allows the hanger 60 to be slidable along the head-rail. The head-rail may have a slot/channel therein such as to retain the head portion 62 and may have an elongate opening (i.e. extending along the length of the channel) allowing the neck 63 and hook 61 to protrude beyond the slot whilst supported by the head structure 62.

The hanger 60 (e.g. the head/support structure 62 thereof) also comprises an actuator that allows the hanger to be rotated in response to an action by a user. The neck portion 63 and/or hook 61 may be selectively rotatable by the actuator. The actuator portion may comprise one or more aperture to receive an actuation member. Alternatively the actuator could be driven by a rack and pinion type arrangement.

The actuation of the hangers can be driven by a manual input or by a motor, e.g. with user controls. In the manual actuation examples, the manual actuator may comprise a cord/string, a chain or a rigid elongate member, such as a wand. The actuation system allows control of the angular orientation (i.e. rotation control) of the hangers and/or the spacing of the hangers along the head-rail.

Various alternatives are possible and any such means that are common in the art will beknown to the person skilled in the art.

Figure 4:
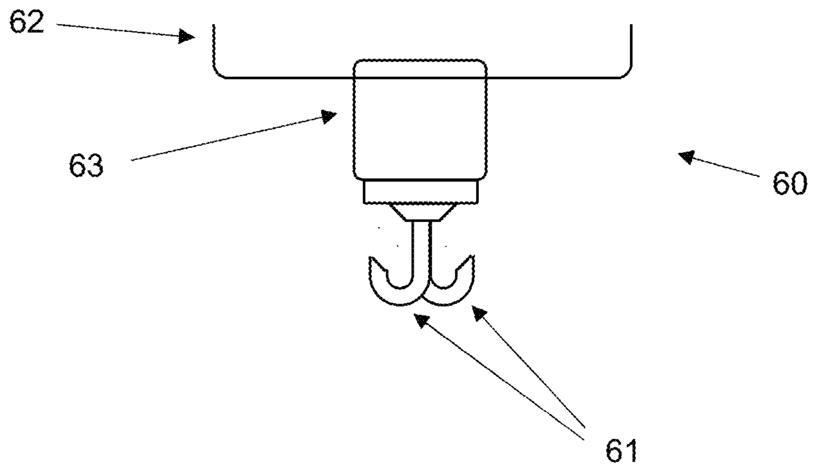
FIG. 4 shows a second embodiment of a hanger.

FIG. 4 shows another example view of a hanger that is substantially identical to the one shown in FIG. 3 with the only difference being that the hanger comprises first and second hooks, such as to form an anchor shape. The two hooks are arranged back-to-back or side-by-side. The two hooks may share a common stem portion.

The hooks could be curved in form or perpendicular. A single hook could receive one or two handles 45, 55 of the connectors, i.e. holding one or two curtain-blind surfaces on each hook, depending on the desired implementation. The hooks could be wider to receive twohandles 45, 55 side-by-side if desired.

Figure 5:
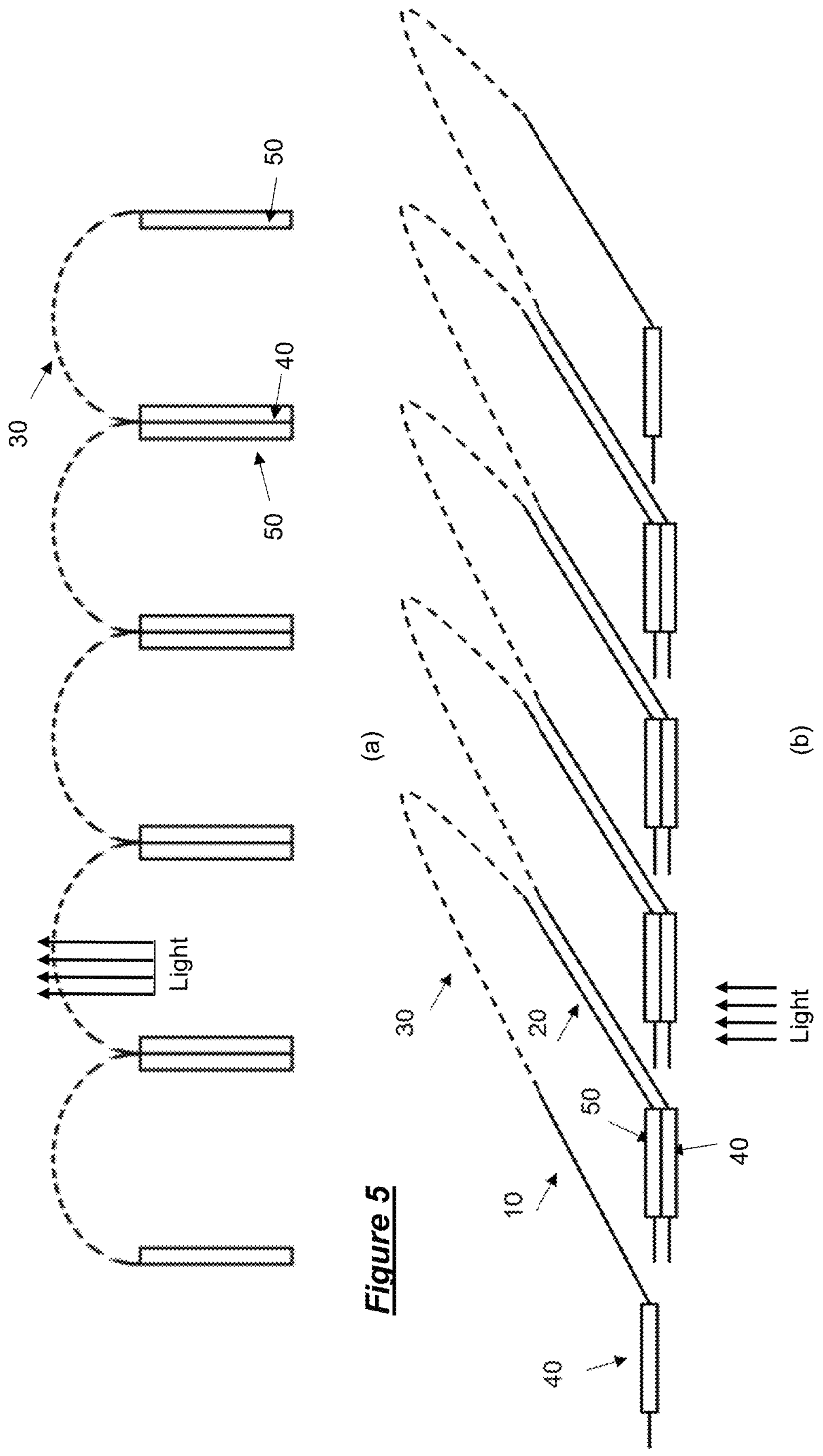
FIG. 5 shows a schematical top-view of a curtain-blind system in a light and dark condition.
Figure 6:
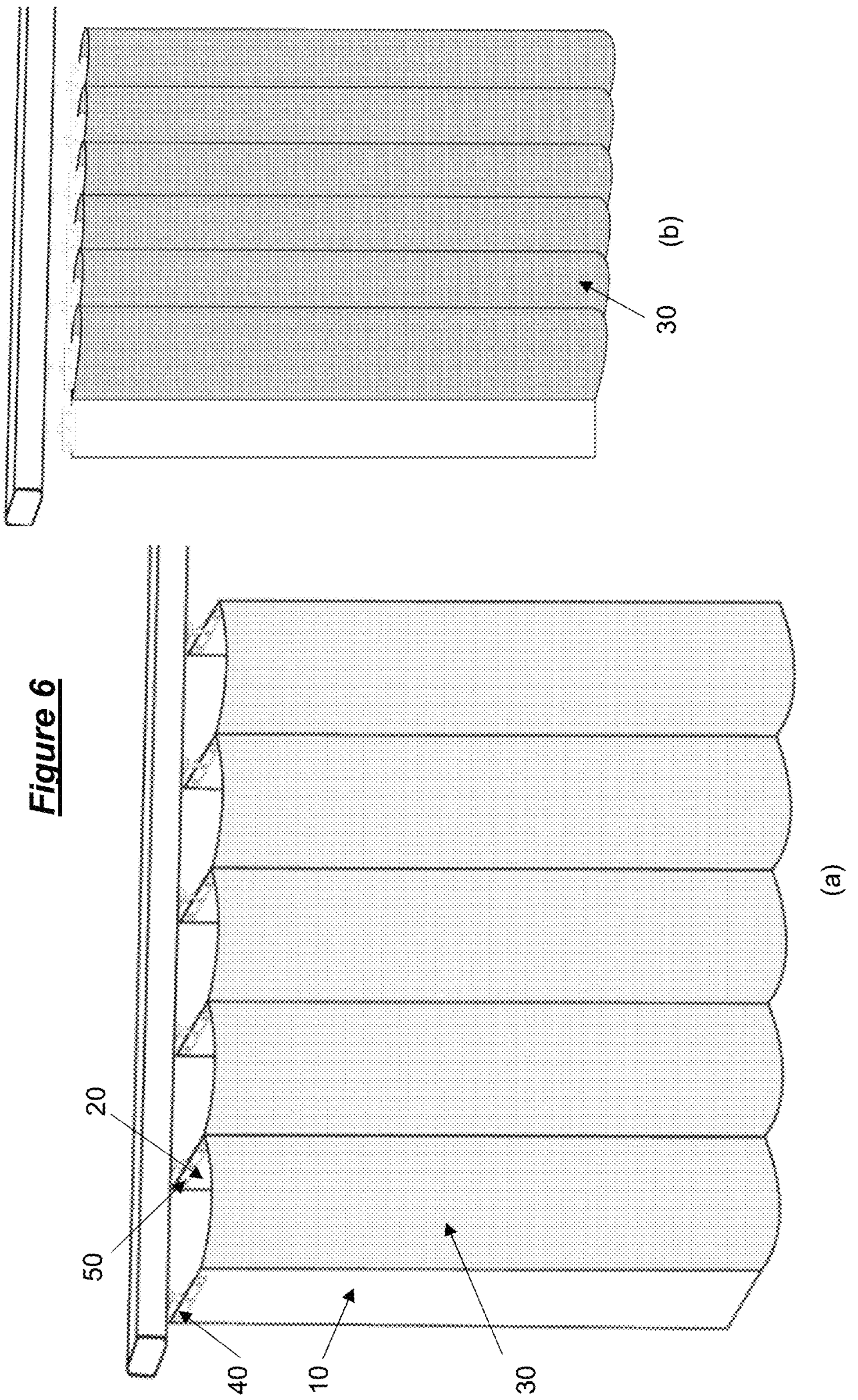
FIG. 6 shows a 3D view of a curtain-blind system in a light and dark condition.

FIGS. 5 & 6 show a schematical top-view and 3D view respectively of the light (a) and dark (b) conditions of the curtain-blind system. The system comprises a plurality of curtain-blind sections in a side-by-side arrangement. In the light condition, the first and second surfaces are substantially parallel to the direction of light, minimizing the surface area of the impermeable surfaces for light contact. The light-permeable third surface extends between the first and second surfaces, as such the light is substantially unencumbered from traversing through the curtain-blind system In the dark condition the curtain-blind sections are angled such that the first surface of one curtain blind section at least partially overlaps the second surface of an adjacent curtain-blind section. Light therefore cannot transverse through the curtain-blind system in the dark condition.

Operation

In use, the curtain-blind system will resemble the embodiment shown in FIG. 6. The curtain-blind system is predominantly considered as a window treatment/cover and as such is considered for use in relation to window frames, although it will be understood that this is non-limiting and may be used in other openings such as door frames.

In the light condition, shown in FIG. 6(*a*), the light transverses through the light permeable third surface into a room. An actuator is then used to move the curtain-blind system into the dark condition shown in FIG. 6(*b*). The actuator may be a pullcord or similar (not shown), the mechanism of which will be known to the skilled person.

The curtain-blind may be also put into a drawn condition in which the drawstring is pulled, actuating the plurality of hangers to slidably move within the head-rail.

To assemble the curtain blind system, the plurality of hangers are slid into the head-rail at an open-end which is then sealed. The head-rail is then mounted within a door or window frame. The first and second surfaces of each curtain-blind section are clamped by a first or second connector respectively. This can be performed at a safe height to mitigate the chances of falling from a chair or a ladder when installing the system.

The handles of the curtain-blind sections can be releasably attached to the hangers, specifically the hooks thereof. Where the hanger comprises a single attachment, such as the J-shaped hanger shown in FIG. 3, the second connector of each curtain-blind section should be first located on a hanger in turn. The first connector of a given curtain-blind section can then be located onto the adjacent hanger which is already holding the second connector of the adjacent curtain-blind section, thereby resulting in the arrangement shown in FIG. 6. In the event of needing to remove an individual curtain-blind section, the first connector can be removed immediately and independently of the second connector of the adjacent curtain-blind section that is on the same hanger. To remove the second connector, the first connector of the opposing adjacent hanger has to be removed in order to gain access thereto. Once done, the curtain-blind section can then be removed. Hence, individual sections can be easily removed and replaced with minimal or no interference with the other curtain-blind sections in the system, thereby making it easier and more convenient to use.

When using a hanger comprising two attachments, such as the dual hook hanger shown in FIG. 4, each curtain-blind section can be both mounted and dismounted from the curtain-blind system independently from both the adjacent curtain-blind sections.

Using the system described herein, multiple successive curtain-blind sections can simply be added and/or removed as desired to form the overall curtain-blind.

The invention claimed is:

1. A curtain-blind system comprising, a plurality of hangers, a plurality of curtain-blind sections, each section comprising, a first surface, a second surface, a first connector on the first surface, a second connector on the second surface, wherein the first connector is releasably hung on a first hanger of the plurality of hangers, and wherein the second connector is releasably hung on a second hanger of the plurality of hangers, and wherein the curtain-blind sections are arranged side-by-side on the plurality of hangers in use to define the curtain-blind system with the first connector of one curtain-blind section being independently releasable from an adjacent curtain-blind section whilst remaining on the first surface, wherein each of the plurality of curtain-blind sections are releasable from its adjacent curtain-blind sections and wherein one connector of each adjacent curtain-blind section being releasably hung on a common hanger of the plurality of hangers.

2. The system according to claim 1, wherein the second connector of said one curtain-blind section is also independently releasable from an adjacent curtain blind section whilst remaining on the second surface.

3. The system according to claim 1, wherein the plurality of curtain-blind sections each comprise a third surface located between the first and second surfaces.

4. The system according to claim 3, wherein the third surface comprises a light-permeable material, relative to the first and second surfaces.

5. The system according to claim 4, where the curtain-blind system is moveable between a light condition and a dark condition, wherein in the light condition, light is unobstructed by the first and second surfaces from traversing through the third surface.

6. The system according to claim 5, where in the dark condition, at least a portion of a first or second curtain-blind section is over-lapping with at least a portion of the first or second surface of an adjacent curtain-blind section such as to obstruct light from traversing through the curtain-blind system.

7. The system according to claim 1, comprising a head-rail for mounting the plurality of hangers.

8. The system according to claim 7, wherein the plurality of hangers are slidable along a longitudinal length of the head-rail.

9. The system according to claim 7, wherein each of the plurality of hangers comprise an axis in which they are rotatable about.

10. The system according to claim 9, wherein the rotation of the hangers moves the curtain-blind system between a light condition and a dark condition.

11. The system according to claim 1, wherein the first connector is comprised of a first and second plate, wherein the first surface of the one curtain-blind section is clamped between the first and second plate.

12. The system according to claim 11, wherein the second connector is comprised of a first and second plate, wherein the second surface of the curtain-blind section is clamped between the first and second plate.

13. The system according to claim 12, wherein the first and second plates comprise complementary engagement members.

14. The system according to claim 13, wherein at least one of the complementary engagement members comprises a pin, a protrusion, a clip, a magnet or a slot.

15. The system according to claim 11, wherein the first or second plate comprise an attachment member for attaching to one of the plurality of hangers.

16. The system according to claim 15, wherein the attachment member comprises a handle.

* * * * *